Nov. 23, 1943.          F. Q. SCHWARTZ          2,334,845
                         CENTER DRILL
                      Filed Feb. 20, 1942
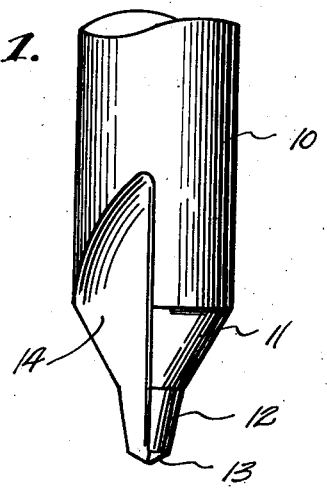
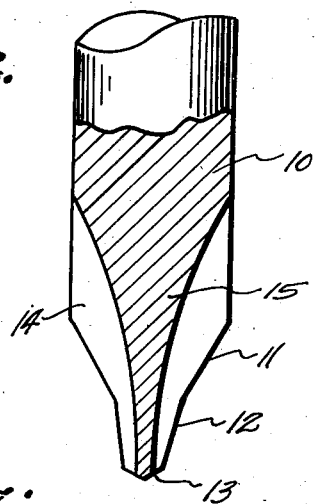
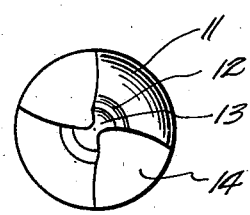
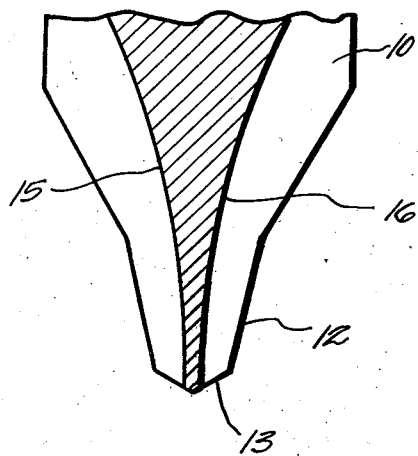
INVENTOR.
Francis Q. Schwartz.
BY Louis Chayka
ATTORNEY.

Patented Nov. 23, 1943

2,334,845

UNITED STATES PATENT OFFICE 2,334,845

CENTER DRILL

Francis Q. Schwartz, Detroit, Mich.

Application February 20, 1942, Serial No. 431,620

3 Claims. (Cl. 77—66)

The purpose of my improvement is to overcome one of the drawbacks inherent in the design of the conventional drills resulting in their breakage while in operation. With this idea in mind, I have made certain changes in the form of the drill which, I submit, are new and useful. By reason of said changes, the stresses to which the drill is subjected in operation are minimized, while that part of the drill which is most subjected to torsional strain while in operation has been considerably strengthened. Tests conducted by me with the new drill herein described have amply proved to me that the danger of breakage has been greatly reduced. This I have accomplished without making the drill heavier and without adversely affecting any of its desirable features.

I shall now describe my improvement with reference to the accompanying drawing, in which:

Fig. 1 is a side view of my improved drill.

Fig. 2 is a sectional longitudinal view of the drill shown in Fig. 1.

Fig. 3 is an end view of the drill shown in previous figures.

Fig. 4 is a view similar to Fig. 3 drawn on an enlarged scale and clearly disclosing the space between the curvilinear faces of the flutes and the faces of the truncated cones.

Similar numerals refer to similar parts throughout the several views.

The drill shown in the above drawing comprises a shank 10, which tapers into a truncated cone 11, called a head or a boring head, and which in turn supports the drilling member 12 provided with a wide angle apex 13. It will be understood that said head 11, the drilling member 12, and the apex 13 are axially aligned.

At this juncture I wish to point out that the drilling member 12 is also made in the form of a truncated form and not in the form of a cylinder. The feature is important and will be fully appreciated in conjunction with flutes 14 with which the drill is provided. The flutes 14 extend from apex 13 upwardly into the body of the shank, as shown, and are separated by a web 15. The shape of the flutes, their depth, and the manner of uniform increase of said depth has a bearing on the thickness of the web, and by reason thereof on the resulting resistance of the drills to breakage. As for the uniform increase of the depth of the flutes, it is one of the principal features of this invention.

In the conventional center drill construction, the drilling member is cylindrical and where such cylindrical portion merges with the tapered portion of the shank, a relatively narrow and restricted passage is formed between the inner curvilinear faces of the flute and the outer face of the drill at the juncture of the cylindrical part of the drilling member and the tapered portion. As a result, chips of metal cut in drilling pack into the restricted space of the flute, preventing free ejection of particles of metal cut in subsequent continuous operation of the drill, increase friction between the drill and the body of metal operated upon, and lead to a breakage of the drill. Were the flute to be deepened at this point, it would materially weaken the web and result in breakage of the drill for that reason.

The distance between the curvilinear inner faces of the flutes and the juncture of the truncated drilling member 12 with the truncated cone 11 is never less than the depth of the flutes at any point from the apex portion 13 to the base of the truncated drilling member 12, as is clearly illustrated in Fig. 4 of the drawing. Because of the conical shape of the drilling member 12, flutes 14 have from their beginning at the apex 13 to a point close to their end in the body of the shank, a uniformly increasing depth without any internal constriction, tightening or shallowing. On the contrary, the space within the flutes shows a gradual expansion in the direction of the shank so that any danger of packing of chips within the flutes is eliminated. Simultaneously, the web is also strengthened as its thickness increases in continuous expansion in the direction away from the apex.

Apart from the fluting, the drill shown by me, has certain advantages because of the shape alone of the drilling member 12, which as was pointed out, is conical in shape. This feature is quite helpful in case the drill, specifically the end of the drill, including all or a part of said drilling member breaks while in operation and while embedded in the object worked upon. When the drilling member is provided with parallel sides as in case of conventional center drills, the grip of the sides of the hole which is being drilled, upon the drilling member, may be so binding, that in case the latter breaks, it is most difficult to remove the broken off part remaining in the hole. In contrast thereto, the removal of the cone shaped drilling member is quite easy.

Having thus described my improvement, I wish to present the following claims:

1. A center drill comprising a shank, a drilling head in the form of a truncated cone, a drilling member extending axially from said head and being also in the form of a truncated cone, a cutting apex at the lower end of the drilling member, said center drill being formed with flutes extending from the apex to a point on the shank above the drilling head, the depth of the flutes at the juncture of the two truncated cones being at least equal to the depth of the flutes at any point from the apex portion to the base of the truncated drilling member.

2. A tool of the class described comprising a cylindrical shank a frusto-conical head on the lower end thereof, a frusto-conical drilling member formed on the lower end of the frusto-conical head and extending axially therefrom, said tool being provided with opposed flutes extending upwardly from the lower end of the drilling member to a point on the shank above the frusto-conical head, the inner faces of the flutes being curvilinear, the depth of the flutes at the juncture of the frusto-conical head with the frusto-conical drilling member being at least equal to the depth of the flutes at any point from the lower end of the drilling member to the base thereof.

3. A tool of the class described comprising a cylindrical shank, a frusto-conical head on the lower end thereof, a frusto-conical drilling member formed on the lower end of the frusto-conical head and extending axially therefrom, a cutting apex formed on the lower extremity of the drilling member, said tool being provided with opposed flutes extending upwardly from the lower end of the cutting apex to a point on the shank above the frusto-conical head, the inner faces of the flutes being curvilinear, the depth of the flutes at the juncture of the frusto-conical head with the frusto-conical drilling member being at least equal to the depth of the flutes at any point from the cutting apex to the base of the frusto-conical drilling member.

FRANCIS Q. SCHWARTZ.